United States Patent [19]

Guse et al.

[11] 4,144,157

[45] Mar. 13, 1979

[54] ACRYLIC AND METHACRYLIC SELF-ADHESIVE COMPOSITION AND RADIATION METHOD OF MAKING SAME

[75] Inventors: Günter Guse; Ernst Lukat; Peter Jauchen; Wolfdieter Lenck, all of Hamburg; Hanns Pietsch, Neuer Wall, all of Fed. Rep. of Germany

[73] Assignee: Beiersdorf Aktiengesellschaft, Hamburg, Fed. Rep. of Germany

[21] Appl. No.: 608,246

[22] Filed: Aug. 27, 1975

[30] Foreign Application Priority Data

Sep. 11, 1974 [DE] Fed. Rep. of Germany ....... 2443414

[51] Int. Cl.$^2$ .............................. C08F 2/46; C08F 4/00
[52] U.S. Cl. ........................... 204/159.23; 204/159.22; 96/115 P; 427/54; 428/463; 428/483; 526/271; 526/317; 526/320; 560/221
[58] Field of Search ................... 560/221; 204/159.22, 204/159.23; 96/115 P

[56] References Cited

U.S. PATENT DOCUMENTS 3,661,618  5/1972  Brookman et al. ................... 117/62

FOREIGN PATENT DOCUMENTS 1594193  4/1971  Fed. Rep. of Germany.
2209256  9/1973  Fed. Rep. of Germany.

OTHER PUBLICATIONS

Stueben, Kenneth C., Radiation Curing of Pressure-Sensitive Adhesive; A Literature Review, Adhesives Age, Jun., 1977, pp. 16–21.

*Primary Examiner*—Richard B. Turer
*Attorney, Agent, or Firm*—Bierman & Bierman

[57] ABSTRACT

A self-adhesive composition comprising a crosslinked copolymer of 0.01 to 5% by weight based on said composition of a compound taken from the class consisting of acrylic and methacrylic-[(2-alkoxy-2-phenyl-2-benzoyl) ethyl] esters and at least one monomer capable of producing a self-adhesive polymer. A method of preparation of the composition is also disclosed.

12 Claims, No Drawings

ACRYLIC AND METHACRYLIC SELF-ADHESIVE COMPOSITION AND RADIATION METHOD OF MAKING SAME

This application claims the priority of German application No. P 24 43 414.8 filed Sept. 11, 1974.

The present invention relates to novel self-adhesive compositions crosslinked by ultraviolet radiation.

It has previously been known to cause polymerization of olefinic monomers by exposure to ultraviolet radiation in the presence of sensitizers such as benzoin, benzoin derivatives, or azo compounds. If the monomers or parts thereof are polyunsaturated, it is also possible to achieve crosslinking during or after polymerization.

It is also known that polymerized materials can be crosslinked by the use of ultraviolet radiation after the addition of a photosensitizer such as benzoin, its derivatives or mixtures thereof. However, this suffers from a rather serious disadvantage in that the admixture of the photosensitizers to the highly viscous polymer is a difficult and complicated operation. Furthermore, these processes were intended to produce highly crosslinked end products — for example lacquers and printing inks — as are frequently started from unsaturated polyesters as the basic polymers.

There have been many attempts to incorporate photosensitizing groups, such as cinnamate or azido compounds into polymers either by copolymerization with the corresponding monomers or by subsequent polymer-analogous reactions. In all cases, including those in which exotic monomers were used, highly crosslinked end products were obtained. It was not possible to produce by ultraviolet crosslinking polymers of lower crosslinking densities which are necessary for self-adhesive compounds.

In No. DOS 1,594,193, there is disclosed a method of producing self-adhesive tapes by ultraviolet polymerization of monomers, monomer mixtures, or monomer-polymer mixtures on the substrate. However, considerable technical difficulties were encountered in the technical realization of this method. In order to eliminate the inhibiting action of atmospheric oxygen, and also as protection against fire and explosion, it is necessary to carry out this process in a closed tube under an inert gas. Since the source of ultraviolet radiation is located outside the tube, the tube must be provided with ultraviolet permeable windows. These are to be made normally of quartz. In addition, elaborate cooling devices, such as water-cooled mercury baths, are required to remove the heat of polymerization.

Despite these extreme precautions, this process can only produce adhesive tapes of up to 60 millimeters in width and, even these are produced at a very low rate. The process requires a residence time in the ultraviolet tube of from 3–15 minutes. In addition to that, 15–45 minutes is required in a heated oven immediately thereafter.

It is therefore the object of this invention to provide crosslinked high grade self-adhesive compositions based on polyacrylates and a method for their production which is characterized by great economy and simplicity of operation. While the present invention is primarily intended for tapes and webs, it is, nonetheless, applicable to surface areas of products of virtually any shape.

In its broadest aspect, the invention refers to self adhesive compositions comprising cross-linked copolymers of 0.01 to 5 percent by weight based on said composition of a compound taken from the class consisting of acrylic and methacrylic acid-[(2-alkoxy-2-phenyl-2-benzoyl) ethyl] esters and at least one monomer capable of producing a self-adhesive polymer. Such monomers are generally known in the art. Preferably the acrylic and methacrylic ester derivatives (which are used as photo-initiators) contain 1–4 carbon atoms in the alkoxy group.

The self adhesive compositions are produced by mixing the monomers in the appropriate proportions followed by polymerization in the usual manner. The polymerized compositions are then exposed briefly to ultraviolet radiation for crosslinking.

In No. DOS 2,209,256, numerous benzoin derivatives (including some according to the present invention) are disclosed. These derivatives are mixed into thermoplastic molding compounds, particularly films or foams of polyethylene, polypropylene or polystyrene, and serve to accelerate their degradation by the action of ultraviolet light. It can be seen that it is totally unexpected that photo-initiators according to the present invention can be copolymerized by known methods with acrylic acid derivatives without losing their photo-initiator effect and further that the crosslinking of the self-adhesive co-polymers can be carried out subsequently by ultraviolet irradiation. The copolymerized material can be transformed into any desired degree of crosslinking by ultraviolet irradiation of a few seconds. In almost all cases, the desired degree of crosslinking can be attained in less than five seconds irradiation and preferably in approximately one second.

The improvement of the present invention overcomes the various technical disadvantages of the prior art. It is no longer necessary to mix small amounts of photo-initiators into highly viscous polymers, nor is it necessary to carry out polymer-analogous reactions or elaborate and uneconomical polymerization on the substrate in order to achieve a self-adhesive material. By following the teachings of the present invention, it is possible to obtain photo-sensitive polymers in conventional plants which, when spread on the substrate material, can be crosslinked by ultraviolet irradiation in a very short time and at high speed.

The polymerizable photo-initiators of the present invention are prepared preferably by esterification of the corresponding alpha-methylol benzoin alkyl ethers with acrylic or methacrylic chloride at temperatures below 5° C. in the presence of organic bases such as pyridine or triethylamine.

The copolymerization of the photo-initiators with the other monomers can be effected according to the known methods of polymerization; such as, block-, solution-, or emulsion polymerization. These monomers are the ones known in the art to be capable of yielding self-adhesive polymers. Typically, esters of acrylic or methacrylic acids as well as mono- or di-alkyl esters of maleic or fumaric acids are quite suitable. In particular, those esters having alkyl groups of 4–12 carbon atoms are particularly preferred.

In addition to the foregoing monomers, up to about 25 percent by weight based on the total composition of lower acrylic or methacrylic esters, vinyl esters, and vinyl aromates may also be included. Particularly suitable are methyl or ethyl acrylates or methacrylates, vinyl acetate or propionate, and styrene.

Furthermore, certain comonomers having reactive groups can also be used in the composition in amounts up to about 15 percent by weight based on the composition. Such compounds as acrylic and methacrylic acids, maleic acid and anhydride, acrylamide and methacrylamide, and acrylonitrile and methacrylonitrile can all be polymerized to obtain particularly useful and desirable self-adhesive properties in the final composition.

It is totally unexpected that the photo initiators neither inhibit the polymerization nor cause undesired premature crosslinking and gelling. The activity of the photo-initiators, and thus the crosslinking capacity of the copolymers, is fully maintained even on prolonged storage prior to radiation. The shelf life remains good even if the compound contains acid residues and residual polymerization initiator, such as peroxy- or azocompounds.

The amount of photo-initiator to be used is between 0.01 and 5% percent by weight, based upon the total amount of monomers. Preferably the photo-initiator is present in an amount of 0.15 to 2% percent by weight based upon the total monomers. The average molecular weight of the copolymers hereafter expressed by the K-value according to Fikentscher (measured in toluene at 25° C.), can vary within wide limits between about 40 and 80 and can be adjusted to a desired value by the addition of small amounts of conventional chain transfer substances such as tetrabromomethane.

If special properties of the end products are desired, the copolymers can be mixed with modifying additives as are known in the art. Such materials as tackifying resins, plasticizers, and other elastomers may all be included as needed or desired. However, the copolymerized photo-initiator compound must comprise at least 0.01 percent by weight of the total mixture.

The adhesives do not require admixture of reactive crosslinking agents or catalysts and hence are stable. The problem of limited shelf or pot life is therefore eliminated. Moreover, the adhesives of the present invention (including their modified mixtures) are of remarkable thermostability. They can be heated to temperatures up to about 200° C. without causing premature crosslinking and without destroying the photo-initiator effect. Thus, they can be processed directly from the melt before irradiation.

These materials present no particular problems in the production of self-adhesive products as, for example, adhesive tapes. The compositions or their solutions or emulsions are applied in the known manner on the substrate materials. Optionally, a prime coat for the adhesive can be provided and/or a release coat can be placed on the back. It is also feasible to apply the compositions on intermediate layers provided with a release coating, followed by drying and transfer to the desired carrier layer. The transfer can be effected either before or after the ultraviolet irradiation.

If there are any volatile components present (e.g. solvents or water), they are evaporated after the application onto the substrate at temperatures between room temperature and about 150° C. The ultraviolet irradiation can be effected subsequently or, if desired, after winding, intermediate storage, and unwinding of the coated substrate.

The process is carried out in a tube through which the coated material passes. In view of the simplicity of the present process, the tube is substantially closed in order to protect the environment from scattered radiation, but not gastight sealed and contains no elaborate structural elements — such as cooling devices. In other words, the irradiation can be carried out in the presence of atmospheric oxygen. The sources of ultraviolet radiation are arranged right in the tube. Preferably, they are high-pressure mercury lamps. The radiation flux of such lamps has a strong secondary maximum at 250 to 270 nm, being adapted to the main absorption of the copolymerized photo-initiators, which is at 254 nm. The length of the ultraviolet zone is 60 centimeters and a distance of 15 to 25 centimeters is maintained between the source of radiation and the coated material. Since a residence time of 1 second in the radiation field is sufficient to produce adequate crosslinking, the tube can be traversed by the coated material at 36 meters per minute. Obviously, even higher speeds can easily be obtained by extending the length of the ultraviolet irradiation zone. The coating of the substrate, drying and irradiation can all be effected substantially simultaneously, and the coated materials can thereafter be cut to the desired width and length and wound onto rolls.

In addition to the advantages already mentioned, these cross-linked self-adhesive compounds are high grade products; that is, they are resistant to the action of solvents and weather and have excellent shear strength coupled with good adhesion, even at elevated temperatures. Furthermore, by means of the present invention, it is possible to cross-link the adhesives on temperature-sensitive substrates, even in the case of direct coating. Usually, this cannot be achieved by the prior art processes because the high temperatures required will cause deterioration of the substrates. Moreover, the anchoring of the self-adhesive compound to the substrate is improved under the influence of the ultraviolet radiation.

The following examples will illustrate the invention.

EXAMPLE 1

Preparation of Acrylic-acid [(2-methoxy-2-phenyl-2-benzoyl)-ethyl] ester.

182 g of alpha-methylolbenzoin methyl ether (0.71 mol) and 78.5 g of triethylamine (0.78 mol) are dissolved in 350 g of anhydrous benzene, and the resultant solution is cooled to 0° to 5° C. 70.5 g of acrylic chloride are dissolved in 350 g of anhydrous benzene and are added dropwise within 2 hours to the well stirred solution. The temperature after the addition is kept constant for another 2 hours under continued stirring. The benzene is distilled off and the residue taken up in 1 liter of diethyl ether. The precipitated triethylamine hydrochloride is filtered off and washed with additional ether. The ether solutions are then combined and the ether is distilled off.

198 g (90% of the theoretical yield) of the desired ester are obtained in the form of a yellow oil which can be used for polymerization without further purification.

In thin-layer chromatography, using precoated silicagel TLC plates and cyclohexane-ethyl acetate 2:1 as solvent, this ester showed an $R_f$ value of 0.75. For further analysis, it was purified by column chromatography and yielded then the following values ($C_{19}H_{18}O_4$; Mol. Wt = 310.35):

|   | Calculated | Found |
|---|---|---|
| C | 73.53 | 73.27 |
| H | 5.85 | 5.95 |
| O | 20.62 | 20.78 |

The molecular weight, measured by vapor pressure osmometry in chloroform at 45° C., was 311 and the bromine number was 48 (theoretical is 51.4).

The preparation of the other photo-initiators according to the invention is effected in a similar manner.

EXAMPLES 2-9 AND REFERENCE EXAMPLE 1

The monomer mixtures as set forth in Table I were copolymerized in solution. Reference example 1 contained no photo-initiator according to the invention and constituted a control.

The polymerization batches each consisted of 60% by weight of the monomer mixture and 40% by weight of gasoline (b.p. 60°-95° C.)-acetone in a weight ratio of 2:1 as the solvent. In a conventional reaction vessel of glass or steel, equipped with reflux condenser, stirrer, thermometer and gas inlet, the solution was freed from oxygen by rinsing with nitrogen and heated to reflux. By adding 0.3% by weight of dibenzoyl peroxide (containing 20% water), the polymerization was started. During the polymerization time of about 20 hours, the batches were diluted with additional solvent several times, as necessary, depending on the viscosity — so that the finished polymer solutions had solid contents of about 35 to 45% by weight. The results are set forth in Table I wherein the compositions are in percent by weight.

portions were evaporated at temperatures between room temperature and about 70° C. Then the coated films were exposed to the UV radiation of high-pressure mercury burners (Hanau Q 1200 (O,g kW) or Philips HTQ 7 (4×2 kW)) without excluding atmospheric oxygen. After various periods of irradiation, the adhesive power, holding power, and insoluble portion of the compositions were determined.

Test of adhesive power

Strips of 20 mm width of material being tested were adhered on polished and degreased plates of stainless steel and roller over five times to and fro with a weighted roller (2 kg/cm of tape width at a rate of 10 m/min.). The test strip was removed from the steel plate in a tensile testing machine and the measured force indicated in pond/cm. (pull off angle: 180°, speed: 30 cm/min.).

Test of holding power

A strip of about 15 cm length and 20 mm width was adhered on a polished and degreased plate of stainless steel so that it covered a length of 2.54 cm (1 inch). The strip was pressed on with a 2 kg roller by moving it

TABLE I

| Example | 2 | 3 | 4 | 5 | 6 | 7 | 8 | 9 | Ref. Ex. 1 |
|---|---|---|---|---|---|---|---|---|---|
| Photo-initiator 1 | — | — | — | — | 2.0 | — | 2.0 | 2.0 | — |
| Photo-initiator 2 | 0.2 | 0.5 | 1.0 | 1.5 | — | 2.1 | — | — | — |
| Acrylic acid-2-ethylhexyl ester | 73.8 | 73.5 | 73.5 | 73.5 | 72.0 | 71.9 | 82.0 | 94.0 | 74.0 |
| Acrylic acid methyl ester | 20.0 | 20.0 | 19.5 | 19.0 | 20.0 | 20.0 | — | — | 20.0 |
| Acrylic acid | 6.0 | 6.0 | 6.0 | 6.0 | 6.0 | 6.0 | 6.0 | — | 6.0 |
| Acrylamide | — | — | — | — | — | — | — | 4.0 | — |
| Acrylonitrile | — | — | — | — | — | — | 10.0 | — | — |
| Tetrabromomethane | — | — | — | — | 0.03 | 0.03 | — | — | — |
| Polymerization yield (% of monomer used) | 97.4 | 95.8 | 100 | 97.5 | 99.5 | 99.5 | 98.6 | 100 | 97.0 |
| K-value (Toluene 25° C) | 64.0 | 63.9 | 65.9 | 69.9 | 62.4 | 60.5 | 49.0 | 58.7 | 58.7 |

Photo-initiator 1 = Acrylic acid-[(2-methoxy-2-phenyl-2-benzoyl)-ethyl]-ester
Photo-initiator 2 = Acrylic acid-[(2-ethoxy-2-phenyl-2-benzoyl)-ethyl]-ester

EXAMPLE 10 — EFFECT OF UV IRRADIATION

The copolymer solutions according to Examples 2-9 and Reference Example 1 were applied to polyethylene terephthalate films of 25 mµ thickness and the liquid once back and forth. Plate and strip were suspended vertically and the free end of the strip loaded with weights of 800 or 1000 g. The test was made at the temperatures set forth in Tables III and IV. The time in minutes until the strip fell off is indicated.

TABLE II

| Polymer acc. to Example | Adhesive Power (p/cm of tape width) | | | | | | | | |
|---|---|---|---|---|---|---|---|---|---|
| | 2 | 3 | 4 | 5 | 6 | 7 | 8 | 9 | Reference 1 |
| Coating Weight Dry (g/m²) | | 21 | 22 | 23 | 29 | 28 | 27 | 27 | 20 |
| without irradiation | | 350 | 310 | 340 | 360 | 335 | 360 | 400 | 360 |
| After irradiation with Q 1200 (0.9kW) (24 cm distance) | | | | | | | | | |
| 2 sec | | 340 | 310 | 310 | 290 | 290 | 290 | 280 | 340 |
| 4 sec | | 330 | 300 | 310 | 285 | 285 | 290 | 245 | 350 |
| 7 sec | | 330 | 285 | 275 | 275 | 275 | 290 | 200 | 345 |
| 10 sec | | 320 | 265 | 260 | 260 | 255 | 290 | 190 | 340 |
| 20 sec | | 280 | 240 | 230 | 235 | 225 | 275 | 160 | 350 |
| Coating Weight Dry (g/m²) | 25 | 25 | 25 | 25 | 25 | 25 | | | 25 |
| Without Irradiation | 380 | 420 | 370 | 380 | 320 | 310 | | | 350 |
| After Irradiation with HTQ 7 (4 × 2 kW) (24 cm distance) | | | | | (15 cm distance) | | | | |
| 1.3 sec | 425 | | | | 190 | 235 | | | |
| 2 sec | 425 | 400 | 370 | 370 | 185 | 245 | | | 370 |
| 4 sec | 410 | | | | 205 | 250 | | | |
| 7 sec | | | | | | 245 | | | |

TABLE III

| Polymer acc. to Example | 2 | 3 | 4 | 5 | 6 | 7 | 8 | 9 | Ref. 1 |
|---|---|---|---|---|---|---|---|---|---|
| Holding Powder at Room Temperature (min) 1000 g Load | | | | | | | | | |
| Coating Weight Dry (g/m$^2$) | | 21 | 22 | 23 | 29 | 28 | 27 | 27 | 20 |
| Without Irradiation | | 116 | 116 | 344 | 87 | 160 | 79 | 22 | 48 |
| After Irradiation with Q 1200 (0.9 kW) (24 cm distance) | | | | | | | | | |
| 2 sec | | >1200 | >1200 | >1200 | 788 | >1200 | >1200 | 110 | 52 |
| 4 sec | | >1200 | >1200 | >1200 | >1200 | >1200 | >1200 | 420 | 72 |
| 7 sec | | >1200 | >1200 | >1200 | >1200 | >1200 | >1200 | >1200 | 74 |
| 10 sec | | >1200 | >1200 | >1200 | >1200 | >1200 | >1200 | >1200 | 88 |
| 20 sec | | >1200 | >1200 | >1200 | >1200 | >1200 | >1200 | >1200 | 114 |
| Coating Weight Dry (g/m$^2$) | 25 | 25 | 25 | 25 | 25 | 25 | | | 25 |
| Without Irradiation | 56 | 103 | 83 | 182 | 92 | 175 | | | 38 |
| After Irradiation with HTQ 7 (4 × 2 kW) (24 cm distance) | | | | | (15 cm distance) | | | | |
| 1.3 sec | >1200 | | | | >11000 | >11000 | | | |
| 2 sec | >1200 | >1200 | >1200 | >1200 | >11000 | >11000 | | | 43 |
| 4 sec | >1200 | | | | >11000 | >11000 | | | |
| 7 sec | | | | | | >11000 | | | |

TABLE IV

| Polymer acc. to Example | 2 | 3 | 4 | 5 | 6 | 7 | 8 | 9 | Ref. 1 |
|---|---|---|---|---|---|---|---|---|---|
| Holding Powder at 50° C (min) 800 g Load | | | | | | | | | |
| Coating Weight Dry (g/m$^2$) | | 21 | 22 | 23 | 29 | 28 | 27 | 27 | 20 |
| Without Irradiation | | 35 | 61 | 141 | 24 | 19 | 79 | 5 | 18 |
| After Irradiation with Q 1200 (0.9 kW) (24 cm distance) | | | | | | | | | |
| 2 sec | | 622 | >1200 | >1200 | 127 | 311 | 196 | 12 | 24 |
| 4 sec | | >1200 | >1200 | >1200 | 342 | >1200 | 430 | 20 | 20 |
| 7 sec | | >1200 | >1200 | >1200 | >1200 | >1200 | 642 | 38 | 23 |
| 10 sec | | >1200 | >1200 | >1200 | >1200 | >1200 | >1200 | 164 | 26 |
| 20 sec | | >1200 | >1200 | >1200 | >1200 | >1200 | >1200 | 220 | 24 |
| Coating Weight Dry (g/m$^2$) | 25 | 25 | 25 | 25 | 25 | 25 | | | 25 |
| Without Irradiation | 18 | 23 | 21 | 38 | 28 | 22 | | | 13 |
| After Irradiation with HTQ 7 (4 × 2 kW) (24 cm distance) | | | | | (15 cm distance) | | | | |
| 1.3 sec | >1200 | | | | >11000 | >11000 | | | |
| 2 sec | >1200 | >1200 | >1200 | >1200 | >11000 | >11000 | | | 14 |
| 4 sec | >1200 | | | | >11000 | >11000 | | | |
| 7 sec | | | | | | >11000 | | | |

Insoluble portion

The toluene-insoluble portion was determined on the irradiated copolymers according to Examples 3, 4, 5 and Reference Example 1 in order to demonstrate the cross-linking effect. The data is summarized in Table V.

TABLE V

| Polymer acc. to Example | 3 | 4 | 5 | Ref. 1 |
|---|---|---|---|---|
| Insoluble Portion (% by wt.) after Irradiation with Q 1200 (0.9 kW) | | | | |
| 0 sec | 0 | 0 | 0 | 0 |
| 2 sec | 40.0 | 35.9 | 55.7 | 0 |
| 4 sec | 48.0 | 50.2 | 69.6 | 0 |
| 7 sec | 55.8 | 62.2 | 76.8 | 0 |
| 10 sec | 69.8 | 69.3 | 79.7 | 0 |
| 20 sec | 73.0 | 77.7 | 84.7 | 0 |

A comparative examination of the measured values listed in Tables II to V shows that the copolymers produced according to the invention become high-grade self-adhesive compounds by UV irradiation. They show good adhesive power and excellent shearing strength, corresponding with high insoluble portions. The polymer according to the state of the art without addition of the photoinitiator (Reference Example 1) has a low shear strength, even after irradiation, and must be considered as being of comparatively low quality.

EXAMPLE 11, 12 AND REFERENCE EXAMPLE 2

The monomer mixtures were copolymerized in the absence of solvents in accordance with Table VI. The data is in % by weight.

TABLE VI

| Example | 11 | 12 | Ref. Ex. 2 |
|---|---|---|---|
| Acrylic acid [(2-methoxy-2-phenyl-2-benzoyl)-ethyl]-ester | 2 | — | — |
| Acrylic acid [(2-ethoxy-2-phenyl-2-benzoyl)-ethyl]-ester | — | 2 | — |
| Acrylic acid butylester | 29 | 29 | 30 |
| Acrylic acid-2-ethylhexylester | 29 | 29 | 30 |
| Vinylacetate | 18 | 18 | 18 |
| Fumaric acid-di-2-ethylhexylester | 10 | 10 | 10 |
| Acrylonitrile | 7 | 7 | 7 |
| Pentaerythritolester of dimerized colophony (Pentalyn K from Hercules Powder) | 5 | 5 | 5 |
| Polymerisation yield (%) | 92 | 92 | 93 |
| K-Value (toluene, 25° C) | 46.5 | 45.7 | 49.7 |

The monomers were charged into the reaction vessel which was equipped with a reflux condenser, stirrer and nitrogen inlet without the addition of a solvent. The reaction mixture was heated with stirring to 60° C. under a current of nitrogen, then 0.3% dibenzoyl peroxide was added (containing 20% water) and polymerized for 1 hour at about 65° C. Subsequently, an additional 0.2% dibenzoyl peroxide was added and further polymerized at about 80° C. for three hours, after which an additional 0.5% dibenzoyl peroxide was added, and the reaction was completed after five hours at 90° C. Finally 0.5% of 1,6di-tert.-butyl-4-methyl-phenol was added to the reaction mixture. The polymers were diluted with trichloroethylene to about 40% solid content, and the polymer solution was discharged.

In order to check the self-adhesive properties, the polymers were applied to a polyethylene terephthalate film of 25 μm thickness and dried. Strips of 2 cm width were cut off from these adhesive films and the self-adhesive properties were measured both before and after irradiation. The irradiation was effected with mercury lamps, using in Example 11 one "Hanau Q 1200" lamp with a power of 900 watts, and in Example 12 and in Reference Example 2 four "Philips HTQ 7" lamps of 2000 watts each. The distance in each case was 24 cm and the results are compiled in the following Table VII.

TABLE VII

| Polymer acc. to example | 11 | 12 | 12 | Ref. 2 |
|---|---|---|---|---|
| Coating weight dry (g/m²) | 18 | 25 | 50 | 31 |
| Adhesive Power (p/cm) without irradiation | 260 | 280 | 360 | 390 |
| 30 sec with Q 1200 | 210 | — | — | — |
| 1.8 sec with HTQ 7 | — | 210 | 300 | 340 |
| Holding-Power (min.) (Room Temperature 800 g) without irrad. | 47 | 109 | 30 | 40 |
| 30 sec with Q1200 | >10000 | — | — | — |
| 1.8 sec with HTQ 7 | — | >10000 | 1018 | 450 |
| Holding-power (min) (50° C, 800 g) without irradiation | 9 | 12 | 7 | Unmeasurable |
| 30 sec with Q1200 | >10000 | — | — | — |
| 1.8 sec with HTQ 7 | — | 421 | 81 | 17 |

EXAMPLE 13 — EFFECT OF THERMAL TREATMENT BEFORE IRRADIATION

The photo-crosslinking capacity of the copolymers produced according to the invention is fully maintained even if they are exposed to higher temperatures after application to the substrate film as, for example, for faster elimination of the solvent. The corresponding measured values for a copolymer according to Example 6 are listed by way of illustration. The K-value of this copolymer was adjusted to 58.3 by using 0.05% by weight of tetrabromomethane. The irradiation was effected with the Hanau Q 1200 lamp at a distance of 24 cm. The data is summarized in Table VIII.

TABLE VIII

| Drying at Coating Weight Dry (g/m²) | Room Temperature 22 | 70° C 22 | 100° C 22 | 130° C 22 |
|---|---|---|---|---|
| Adhesive Power (p/cm) | | | | |
| after 0 sec UV | 300 | 370 | 450 | 365 |
| 2 sec | 280 | 305 | 310 | 300 |
| 4 sec | 260 | 295 | 330 | 275 |
| 7 sec | 260 | 2450 | 310 | 270 |
| 10 sec | 230 | 240 | 250 | 215 |
| 20 sec | 200 | 200 | 260 | 200 |
| Holding Power (min) At Room Temperature (1000 g) | | | | |
| after 0 sec UV | 80 | 127 | 172 | 429 |
| 2 sec | 687 | 841 | >1200 | >1200 |
| 4 sec | >1200 | >1200 | >1200 | >1200 |
| 7 sec | >1200 | >1200 | >1200 | >1200 |
| 10 sec | >1200 | >1200 | >1200 | >1200 |
| 20 sec | >1200 | >1200 | >1200 | >1200 |
| Holding-power (min) (at 50° C, 800g) | | | | |
| after 0 sec UV | 28 | 25 | 31 | 52 |
| 2 sec | 93 | 204 | 116 | 851 |
| 4 sec | 346 | >1200 | >1200 | >1200 |
| 7 sec | >1200 | >1200 | >1200 | >1200 |
| 10 sec. | >1200 | >1200 | >1200 | >1200 |
| 20 sec. | >1200 | >1200 | >1200 | >1200 |

EXAMPLE 14 — EFFECT OF RESIN ADDITIONS

The effect of the photo-initiators in the self-adhesive compounds is not reduced by the addition of tackifying resins. With a slight loss of shear strength, greatly increased adhesive power, which may be desirable for some applications, is obtained. The following measured values relate to a copolymer according to Example 6 (K = 58.3), which had been mixed with a pentaerythritolester of hydrated colophony (Foral 105 by Hercules Powder) and dried at room temperature. The irradiation was effected with the Hanau Q 1200 lamp at a distance of 24 cm.

TABLE IX

| Resin addition (% by weight, based on copolymer) | 0 | 10 | 20 | 30 |
|---|---|---|---|---|
| Coating weight dry (g/m²) | 22 | 24 | 25 | 26 |
| Adhesive Power (p/cm) | | | | |
| after 0 sec UV | 300 | 360 | 425 | 500 |
| 2 sec | 280 | 340 | 420 | 470 |
| 4 sec | 260 | 320 | 420 | 460 |
| 7 sec | 260 | 320 | 415 | 440 |
| 10 sec | 230 | 300 | 380 | 440 |
| 20 sec | 200 | 260 | 340 | 420 |
| Holding-power (min.) (at room Temp., 1000g) | | | | |
| after 0 sec UV | 80 | 154 | 173 | 226 |
| 2 sec | 687 | 276 | 192 | 359 |
| 4 sec | >1200 | 1200 | 432 | 535 |
| 7 sec | >1200 | >1200 | 719 | 692 |
| 10 sec | >1200 | >1200 | >1200 | >1200 |
| 20 sec | >1200 | >1200 | >1200 | >1200 |
| Holding-power (min.) (at 50° C, 800g) | | | | |
| after 0 sec UV | 28 | 22 | 23 | 24 |
| 2 sec | 93 | 51 | 32 | 27 |
| 4 sec | 346 | 79 | 55 | 42 |
| 7 sec | >1200 | 344 | 106 | 60 |
| 10 sec | >1200 | >1200 | 320 | 91 |
| 20 sec | >1200 | >1200 | >1200 | 583 |

EXAMPLE 15 — EFFECT OF DIFFERENT COATING WEIGHTS

Using the copolymer according to Example 5, even with higher coating weights, a short residence time of 2 seconds under the Philips HTQ 7 lamps suffices to obtain high shear strength values.

TABLE X

| Coat. Weight dry (g/m²) | 25 | 50 | 75 | 100 |
|---|---|---|---|---|
| Adhesive Power (p/cm) | | | | |
| Without Irradiation | 380 | 440 | 490 | 520 |
| after 2 sec UV | 370 | 420 | 460 | 500 |
| Holding-power (min.) (at room Temp., 1000g) | | | | |
| Without Irradiation | 182 | 167 | 142 | 90 |
| after 2 sec UV | >1200 | >1200 | >1200 | >1200 |
| Holding-power (min.) (at 50° C, 800 g) | | | | |
| Without Irradiation | 28 | 22 | 15 | 7 |
| after 2 sec UV | >1200 | >1200 | >1200 | 460 |

While only a limited number of embodiments of this invention have been specifically disclosed, it is nonetheless to be broadly construed and not to be limited except by the character of the claims appended hereto.

What is claimed is:

1. A method for the preparation of a self-adhesive composition comprising copolymerizing 0.01 to 5% by weight based on said composition of a compound taken from the class consisting of acrylic and methacrylic [(2-alkoxy-2-phenyl-2-benzoyl) ethyl] esters with at least one monomer capable of producing a self-adhesive polymer, followed by crosslinking said composition by exposure to ultraviolet radiation.

2. A method according to claim 1 wherein said exposure is for a few seconds.

3. A method according to claim 2 wherein said exposure is for approximately 1 second.

4. A method according to claim 1 wherein said alkoxy has 1 to 4 carbon atoms.

5. A method according to claim 1 wherein said compound is 0.15 to 2% by weight of said composition.

6. A method according to claim 1 wherein said monomer is taken from the class consisting of derivatives of acrylic and methacrylic acids.

7. A method according to claim 1 wherein said monomer is taken from the class consisting of esters of acrylic, methacrylic, maleic and fumaric acids.

8. A method according to claim 1 wherein said monomer is taken from the class consisting of alkyl esters of acrylic and methacrylic acids and mono- and dialkyl esters of maleic and fumaric acids.

9. A method according to claim 8 wherein said alkyl has 4 to 12 carbon atoms.

10. A method according to claim 1 wherein said composition also comprises up to about 25% by weight based on said composition of an additional monomer taken from the class consisting of lower alkyl acrylic and methacrylic esters, vinyl esters and vinyl aromates.

11. A method according to claim 1 wherein said composition also comprises up to about 15% by weight based on said composition of a reactive comonomer taken from the class consisting of acrylic acid, methacrylic acid, maleic acid, maleic anhydride, acrylamide, methacrylamide, acrylonitrile and methacrylonitrile.

12. The product of the method of claim 1.

* * * * *